United States Patent [19]

Rieter

[11] 3,713,629
[45] Jan. 30, 1973

[54] NON-FOAMING TWO-PHASE CONTACTOR

[75] Inventor: Robert F. Rieter, Neenah, Wis.
[73] Assignee: Kimberly-Clark Corporation, Neenah, Wis.
[22] Filed: Nov. 10, 1970
[21] Appl. No.: 88,313

[52] U.S. Cl. .......................261/112, 23/280, 110/8
[51] Int. Cl. ..........................................B01d 47/00
[58] Field of Search ...........210/63; 261/112; 23/280; 110/8

[56] References Cited

UNITED STATES PATENTS 3,605,872  9/1971  Brault.............................261/112 X Primary Examiner—Michael Rogers
Attorney—Daniel J. Hanlon, Jr., William D. Herrick and Raymond J. Miller

[57] ABSTRACT

Apparatus for obtaining intimate contact between gas and liquid to promote mass transfer and subsequent phase separation without excessive foam. Liquid is entrained in high velocity gas, and the mixture separated by velocity reduction. Particular utility is disclosed for black liquor oxidation.

8 Claims, 6 Drawing Figures

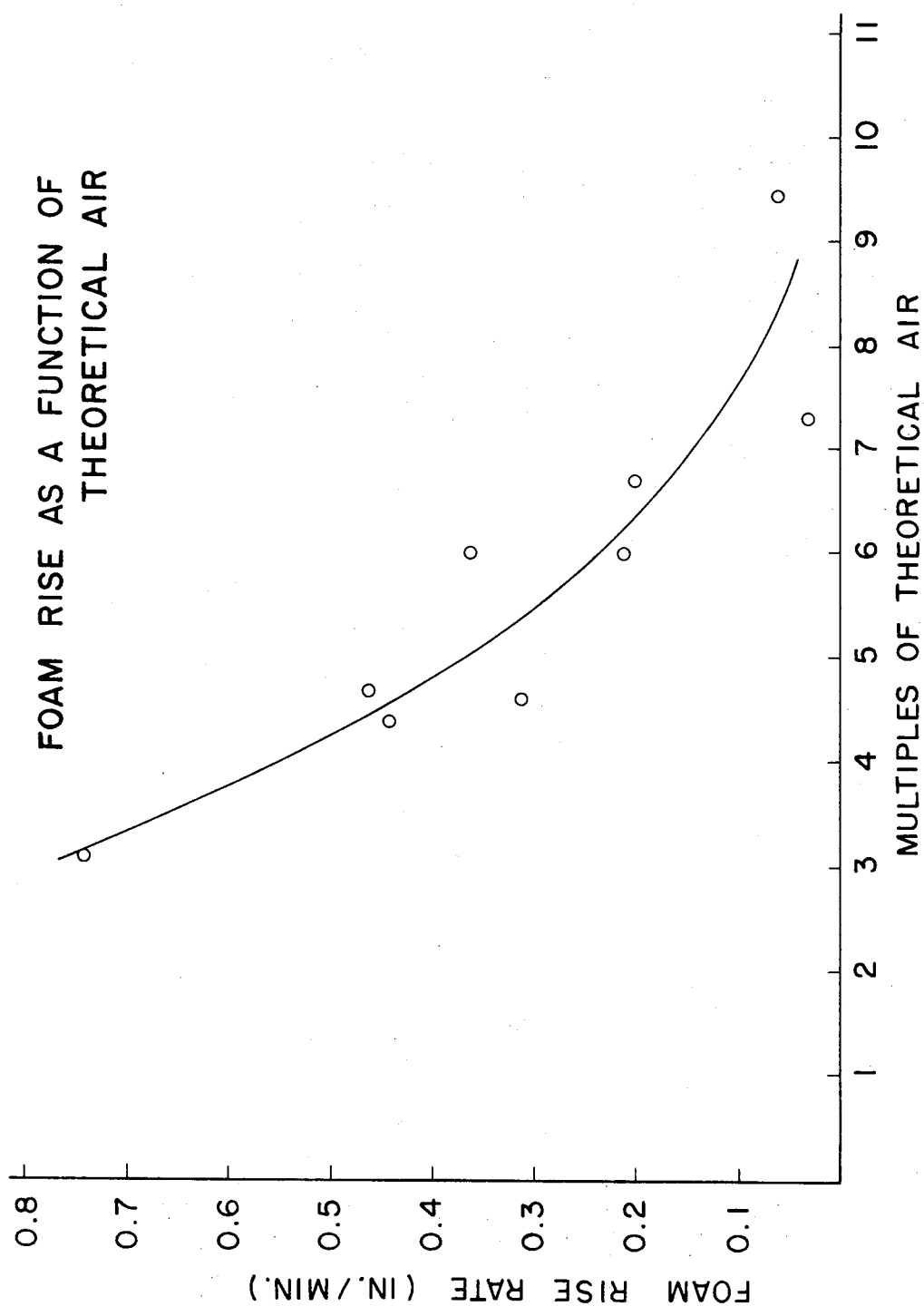

NON-FOAMING TWO-PHASE CONTACTOR

DESCRIPTION OF THE INVENTION

My invention relates generally to two-phase mass transfer devices. More specifically it concerns apparatus for promoting mass transfer between a gas and a liquid through intimate contact. Still more particularly my invention achieves this mass transfer without creating excessive foam.

Certain processes involve one or more steps designed to promote mass transfer between a gas and a liquid. This usually involves bringing both phases into intimate contact for a period under conditions favoring this transfer and subsequent separation of the fluids. Methods and equipment are now available for carrying out these steps. However, a problem often arises for heretofor heretofore no really satisfactory solution has been available. That problem relates to excessive foam which may be produced in the execution of this mass transfer by present methods in a number of processes involving foamable liquids.

It is a primary object of my invention, therefore, to provide apparatus whereby two-phase mass transfer and subsequent phase separation may be brought about without the creation of excessive foam.

Other objects and advantages of my invention will become apparent upon reference to the detailed description below and to the drawings, in which, FIGS. 1 and 1A schematically illustrate the two-phase contactor of my invention;

FIG. 5 is a graph of foam rise rate determinations.

Figure 1:
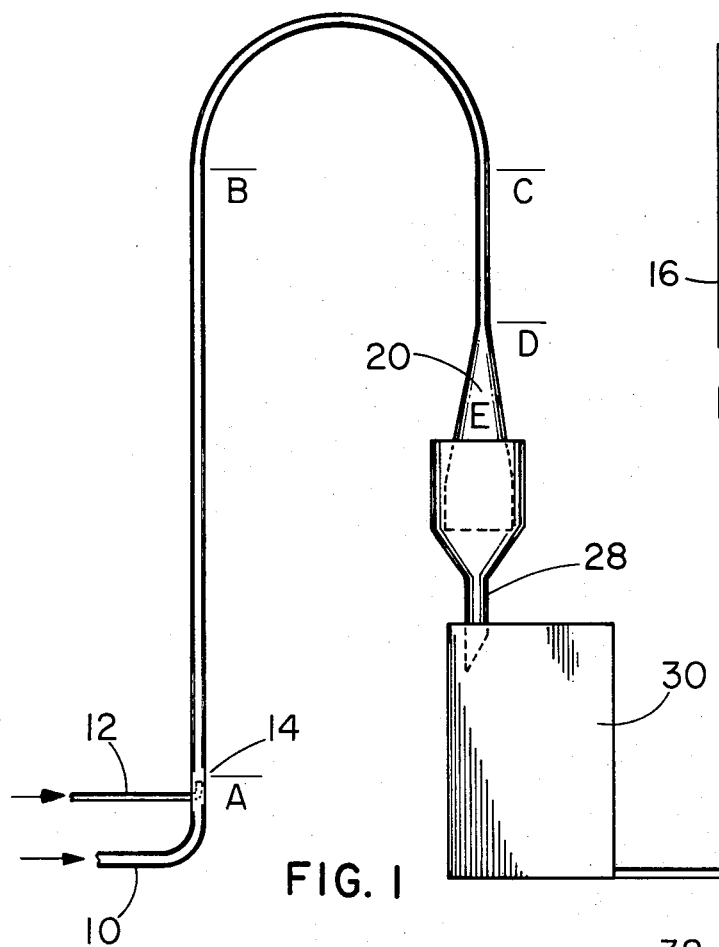

One of the processes in which foaming presents a substantial problem is the oxidation of black liquor. My invention will be illustrated as it may be applied to solve this particular problem; however, it will be recognized that it is not limited thereto and, in its broadest aspects, can be employed in any gas-liquid mass transfer operation. It is intended that all such applications shall fall within the spirit and scope of my invention except as it may be limited by the claims which conclude this disclosure.

Black liquor oxidation is a name which has been given to one of a number of methods used in the pulp and paper industry for the recovery of chemicals from the liquid residue that remains after the pulp has been treated in accordance with the Kraft or sulfate process. In Kraft pulping the wood is barked, chipped, and placed into large pressure digesters along with a solution of cooking chemicals. The chips are cooked at about 115 pounds pressure and 344° F. for 1 to 6 hours. Following the digestion period, the material is dumped into a blowpit or blowtank where the liquor containing the noncellulosic portions of the wood is drained from the pulp. During digestion the sulfide in the cooking liquor combines with organic and inorganic materials, and noxious gases are formed. The pulp is washed with hot water to remove the remaining chemicals. The drainage from the blowpit and pulp washers is known as black liquor and is stored hot in insulated tanks. The pulp is screened, refined, thickened, sometimes bleached, and then converted into paper.

The most prevalent complaint concerning the Kraft or sulfate pulp and paper industry is the emission of malodorous gases into the atmosphere. Under stable meteorological conditions the typical "rotten cabbage" mill odor can be detected tens of miles from a plant site. The odorous gases commonly emitted from the Kraft process result mainly from the oxidation step carried out for recovery of valuable chemicals from black liquor. These gases contain sulfur in the form of hydrogen sulfide, sulfur dioxide, alkyl mercaptans, and their oxidation products.

While the primary purpose of black liquor oxidation is the recovery of chemicals, an important benefit is derived in the substantial elimination of objectionable odors. In the chemical recovery cycle the black liquor is conventionally concentrated in multiple-effect and direct contact evaporators, then burned, and the heat used to produce steam. During evaporation and handling, volatile sulfur compounds continue to be lost. Evaporator exhaust contains gases similar to those released in the digester blow tank. Effluent gases from the recovery furnace contain both sulfurous gases and particulate matter.

While emission control devices are available, because of the many release points and low concentrations, odor-producing materials cannot practically be reduced or eliminated. Thus, the black liquor oxidation process has been devised attack attach the problem at its source—the point where the odor-producing materials can be converted to nonodorous compounds ($Na_2S_2O_3$ and $Na_2SO_4$) which are more stable, less corrosive and generally more desirable for use. An example of the reactions which may be utilized is the following:

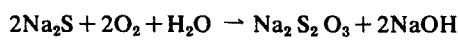

$$2Na_2S + 2O_2 + H_2O \rightarrow Na_2S_2O_3 + 2NaOH$$

Its effectiveness depends upon the method and degree of oxidation. Earlier equipment that has been used includes sparger bubble tanks, evaporation towers, concurrent flow glass towers, and packed columns. The liquor has been intimately mixed with both air and pure oxygen. The latter requires a recovery system as an added expense while the former results in increased foaming problems due to higher gas flow rates. Through the use of my invention such foaming may be minimized thus greatly increasing the effectiveness of the black liquor oxidation process.

Further background information relating to black liquor oxidation may be found by reference to "A Study in the Oxidation of Kraft Black Liquor," by Peter Maura Ricca based on a doctoral thesis, University Microfilms, Inc. (1966).

Figure 1A:
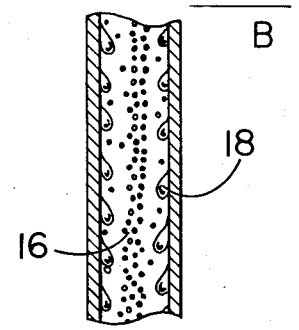

Referring now to the drawings, in FIGS. 1 and 1A there is illustrated schematically an embodiment of my invention. High black liquor is supplied by means of conduit 12 and first contacts the gas stream at point 14. Mist 16 is formed along the length A-B due to the high velocity of the air. Some liquor 18 adheres to the conduit walls while the remainder exists as mist in the core of the flow. There is a continual interchange of liquid between the core and the conduit walls which further enhances oxidation by increasing phase contact. The curved region, B–C, is about 180° with an R/D (R = radius of curvature, and D = nominal diameter of conduit 10) ratio of about 10. Flow in the section C–D is similar to that of section A–B. In section E the phases begin to separate as the overall velocity is reduced by a factor of about one twenty-fifth, and larger droplets form and deposit on the walls of expansion section 20 as is shown more clearly in FIG. 2. The liquid 22 drains to lower edge 24 and falls into funnel 26 where it is directed through spout 28 to settling tank 30. The air, containing a minor amount of liquid exits from the center of the expansion chamber 32 and is directed upward through annulus 33 at a reduced velocity. The major portion of the air is released through stack 34 while the remaining liquid is deposited on the stack wall or trapped by a conventional device at the stack exit (not shown). The cross-sectional area of annulus 33 is preferably less than the cross-sectional area of outlet 35 so as to promote the upward air flow.

Figure 2:
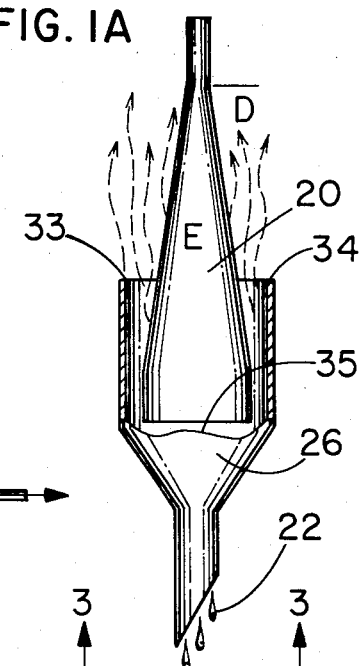
FIG. 2 is a detailed view of the expander assembly or phase separator portion of the contactor.
Figure 3:
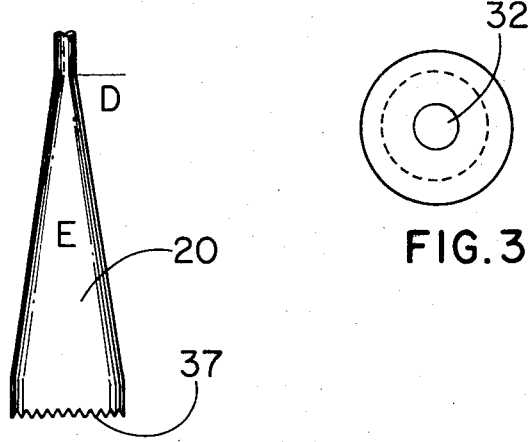
FIG. 3 is an end view of the assembly of FIG. 2.

FIGS. 2 and 3 illustrate the expansion section in more detail showing the liquid and gas flow.

Figure 4:
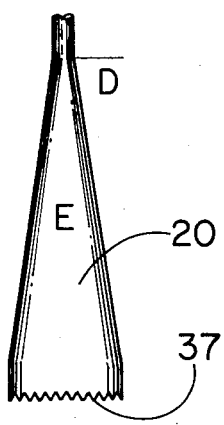
FIG. 4 illustrates a preferred form of phase separator.

FIG. 4 illustrates a preferred expansion section exit shape. Saw-tooth edge 37 is included to promote a steady stream of liquid which flows from each point as opposed to a film of liquid that tends to form at a straight edge. This further reduces the tendency to foam which results when air is blown through a film.

FIG. 5 represents foam rise determinations set forth more fully below.

In operation, intimate contact is maintained between the air and liquid as both are directed from points A to D. In this section black liquor oxidation occurs. The R/D of the curved section is preferably as high as possible so as to minimize crossover; it should be at least 8, and I have found about 10 an economical compromise in a specific arrangement. Liquid crossover refers to the tendency of the liquid when travelling around a bend in a vertical plane to drop to the lower surface which adds to foaming problems. Maintenance of the annular-mist region, A–D, depends upon the volumetric gas to liquid flow ratio. Low flow ratios results in slug or froth flow producing foam. As derived from work published by Govier, G. W., "Developments in the Understanding of the Vertical Flow of Two Fluid Phases," published in *Can. J. Chem. Engr.*, 43, 1, 3–10 (1965), the flow rate necessary for annular-mist flow should conform to the following inequality:

$$L^{0.123} \geq 18.8 \, AG^{-0.877}$$

where
L = Liquid flow rate (cfm)
G = Gas flow rate (cfm)
A = Cross-sectional area of flow path (ft.²)

Its significance is in representing a line separating annular mist flow from froth flow. It will be recognized by those skilled in this art that this line is not capable of exact definition and actually is a grey area of operation where the flow change takes place. Other formulas exist for determining this area, and the above has been selected simply as representing the concept involved.

While it is not intended that my invention should be limited to any particular theory, it is believed that, since foam is in general, a system with a continuous liquid phase in the form of a thin film and a discontinuous gas phase in the form of bubbles, if a gas is exposed to a liquid in a manner which leaves the gas surrounded by the liquid, it is likely that foam will be created if the liquid is impure. On the other hand, an exposure of gas to liquid where the gas is not encapsulated is unlikely to form a foam.

EXAMPLE

While it may not be practical in some high-volume treatment arrangements to use my invention alone, it may be utilized to increase the efficiency of existing devices and at the same time reduce the foam problem. It is in this context that the use of my invention will be illustrated by way of example.

For the purpose of this disclosure, percent efficiency shall be defined as 100 multiplied by the ratio of sulfide ion concentration at the inlet minus the sulfide ion concentration at the outlet to the concentration at the inlet. It is determined generally in accordance with a procedure outlined in "Simultaneous Determination of Hydrogen Sulfide and Mercaptans by Potentiometric Titration," by M. W. Tamele et al., published in *Anal. Chem.* 32, (8), 1007–1011 (1960), modified by selecting 0 mv as the endpoint.

Apparatus was assembled in accordance with FIG. 1. Design was for a maximum air flow of about 370 cfm and maximum liquor flow of 15 gpm. Accordingly, the contactor section comprised 20 feet of 3 inch wrought steel pipe with a 2½ foot radius 180° bend and a 10 foot downward flow section. In the phase separation section the 3-inch diameter was expanded to a diameter of 15 inches in a distance of 4 feet. A large funnel surrounded the exit from the expansion section and drained into a 500 gallon settling tank which was vented and included provisions for pumping deaerated liquor from the bottom.

Air was supplied by a 400 cfm compressor, and equipment was provided for obtaining desired information. Black liquor was provided that had been processed by a conventional sparger unit which was about 97 percent efficient. The pressure drop through my non-foaming contactor was about 3 psi at maximum air and liquor flows. The results of these tests are set forth in Table 1. Non-foaming contactor efficiency is that attributed to the device of my invention when used in series with a conventional sparge tank system.

TABLE 1

| Run | Air CFM | Liquor GPM | Initial Na₂S g/l | Non-foaming Contactor Efficiency% | Overall Efficiency% |
|---|---|---|---|---|---|
| A | 190 | 6.9 | 0.4 | 48 | 98.9 |
| B | 200 | 10.4 | 0.2 | 35 | 98.9 |
| C | 190 | 15.0 | 0.5 | 40 | 97.6 |
| D | 260 | 6.9 | 0.5 | 71 | 99.4 |
| E | 370 | 15.0 | 0.5 | 56 | 98.6 |

In order to give an indication of foaming, the foam rise rate was computed by dividing the accumulation of foam at the end of each run by the time of the run. Most of the foam which was generated by my mist-flow system resulted from action in the settling tank. In contrast to results obtained from conventional sparger units, it was found that the foam rise rate actually decreased with increasing air flow as indicated in FIG. 5. In connection with this drawing, theoretical air is defined as the minimum chemical requirement of air to completely oxidize the available sodium sulfide.

From the above example, it can be seen that oxidation efficiencies of about 99 percent can be obtaining by combining conventional equipment with my invention. The foaming problem is further reduced because less air is required to pass through the sparger.

While it is believed that my invention alone could be utilized to achieve 100 percent efficiency, it is estimated that five or more units in series would be required for treatment of black liquor from a 150 tons per day paper mill having a concentration to be treated of about 25 g/l of $Na_2S$. For economy, the combination of my invention with existing treatments appears to offer the best advantages.

Since the reaction converting $Na_2S$ to sodium thiosulfate occurs best at temperatures between about 165° to 190° F., optimum efficiencies may be obtained when the system is operated at temperatures within this range.

The incoming air velocity is not critical so long as it is sufficiently high to maintain operation of the device within the annular mist regime as defined by the above inequality. In general, conventional compressors supplying, for example, 12,000 cfm at 12 psi may be used for loads of the type required for normal mills.

Similarly, the length of the contact section involves a matter of choice within the constraints which define annular mist operation. Generally, the conduits should be long enough to allow the desired degree of contact and short enough to prevent the velocity from dropping out of the range required for annular mist operation and to prevent an undue pressure drop. For devices of the nature described in the example, a range of from 15 to 40 ft. is believed most practical. Where structural limitations apply, several small units in series may be used instead of one larger one.

Materials of construction for my apparatus may be selected in accordance with the material being treated and desired costs. Alternatives will be apparent to those skilled in this art upon a consideration of factors such as corrosiveness, quantity, and the necessity for avoiding contamination or escape of fluids. With respect to black liquor oxidation, preferred materials include stainless steel, wrought steel, reinforced plastic, fiberglass, or any other material capable of resisting hot, caustic liquids.

While my invention has been described with particular reference to black liquor oxidation, other applications will be apparent to those skilled in this art. For example, it is useful for aeration of fermentation processes, aeration of sewage or waste, or other absorption or stripping process — particularly where foaming is a problem. It is intended that all such applications shall be included within the scope of my invention which shall be limited only as required by the claims.

I claim:

1. Apparatus for obtaining intimate contact and mass transfer between gas and liquid phases and subsequent separation of the phases having a reduced foaming tendency which comprises,
   means for supplying high velocity gas,
   conduit means having an entry location for receiving said high velocity gas and an exit location for releasing gas and liquid,
   means for supplying a liquid,
   means for introducing said liquid into said conduit for said high velocity gas resulting in annular mist flow within the conduit,
   wherein said conduit exit is flared so that its outlet cross section is greater than its cross section at said liquid introduction point whereby the fluid flow rate is reduced to within the froth flow range.

2. The apparatus of claim 1 wherein said conduit exit directs the liquid and gas flow downward into a container having a top cross section larger than said conduit outlet cross section and having an outlet for removing said liquid.

3. The apparatus of claim 1 wherein said conduit is of circular cross section and consists of a straight, vertical section, a bend of about 180° wherein the R/D ratio is greater than eight, and a downward exit section.

4. The apparatus of claim 1 wherein said flared conduit exit is of saw-toothed configuration.

5. Apparatus for black liquor oxidation comprising,
   a source of high velocity air,
   vertical conduit means,
   means for introducing said high velocity air into said conduit,
   means for introducing said black liquor into said air within said conduit producing annular mist flow,
   wherein said conduit means contains a bend of about 180° with a R/D ratio greater than 8 so that its exit is directed downward, said exit being flared to a cross section greater than the conduit cross section at said black liquor introduction point so that the fluid flow rate is reduced to froth flow, and
   wherein said flared exit directs said air and oxidized liquor into a container having a top cross section larger than said exit cross section and having an outlet for removing said oxidized liquor.

6. The apparatus of claim 5 wherein said flared exit edge is of saw-tooth configuration.

7. The apparatus of claim 5 wherein said oxidized liquor is directed to a settling tank to allow removal of remaining gas.

8. The apparatus of claim 5 further including means to maintain a temperature of operation in the range of from about 165° to 190° F.

* * * * *